(12) United States Patent
Helenowski

(10) Patent No.: US 8,021,004 B2
(45) Date of Patent: Sep. 20, 2011

(54) MIRRORED ELEMENT

(76) Inventor: Jacek Helenowski, Stone Park, IL (US)

( * ) Notice: Subject to any disclaimer, the term of this patent is extended or adjusted under 35 U.S.C. 154(b) by 0 days.

(21) Appl. No.: 11/653,165

(22) Filed: Jan. 13, 2007

(65) Prior Publication Data

US 2008/0170309 A1    Jul. 17, 2008

(51) Int. Cl.
*G02B 5/08* (2006.01)
*G02B 5/12* (2006.01)
*A47B 23/06* (2006.01)
*A47B 97/00* (2006.01)
*F21V 33/00* (2006.01)

(52) U.S. Cl. ........ 359/839; 359/528; 362/128; 362/135; 362/138; 362/140

(58) Field of Classification Search ............... 362/128, 362/135–144, 129; 359/528
See application file for complete search history.

(56) References Cited

U.S. PATENT DOCUMENTS

| | | | |
|---|---|---|---|
| 2,879,379 A * | 3/1959 | Lyons .................. | 362/141 |
| 3,598,987 A | 8/1971 | Kipping | |
| 5,215,832 A | 6/1993 | Hughes et al. | |
| 5,228,879 A * | 7/1993 | Fromm .................. | 446/219 |
| 5,248,331 A | 9/1993 | Sanford et al. | |
| 5,314,532 A | 5/1994 | Hughes et al. | |
| 5,373,863 A * | 12/1994 | Prizio .................. | 135/97 |
| 5,575,552 A * | 11/1996 | Faloon et al. ............. | 362/492 |
| 5,657,563 A | 8/1997 | Lane | |
| 5,938,320 A * | 8/1999 | Crandall ............... | 362/494 |
| 5,997,149 A * | 12/1999 | Chu .................... | 362/142 |
| 6,158,877 A * | 12/2000 | Zadro .................. | 362/216 |
| 6,630,769 B2 | 10/2003 | Custodis et al. | |
| 6,676,272 B2 * | 1/2004 | Chance ................ | 362/128 |
| 7,004,599 B2 * | 2/2006 | Mullani ............... | 362/139 |
| 7,086,750 B2 * | 8/2006 | Leyden et al. .......... | 362/135 |
| 7,286,289 B2 | 10/2007 | Bengoechea et al. | |
| 7,287,737 B2 * | 10/2007 | Rossi .................. | 248/475.1 |
| 7,394,538 B2 * | 7/2008 | Bazin .................. | 356/364 |
| 7,455,412 B2 * | 11/2008 | Rottcher .............. | 359/839 |
| 7,600,886 B1 * | 10/2009 | Sullivan et al. ........ | 362/140 |

FOREIGN PATENT DOCUMENTS

| | | |
|---|---|---|
| CN | 1947862 A | 4/2007 |
| DE | 3218416 A1 | 11/1983 |
| DE | 202004016056 U1 | 2/2006 |
| EP | 0662456 A1 | 7/1995 |
| EP | 0971799 A1 | 9/1998 |
| FR | 2393383 A | 12/1978 |
| FR | 2476884 A | 8/1981 |
| FR | 2702871 A1 | 9/1994 |
| JP | 59139969 A1 | 9/1984 |
| JP | 2200218 A1 | 8/1990 |
| JP | 7238242 A1 | 9/1995 |
| JP | 2001033607 A1 | 2/2001 |
| JP | 2003315512 A1 | 11/2003 |
| WO | WO-2007/050494 A1 | 5/2007 |

* cited by examiner

*Primary Examiner* — James Lee
*Assistant Examiner* — David Makiya
(74) *Attorney, Agent, or Firm* — Susan L. Lukasik; Mark C. Zimmerman

(57) ABSTRACT

A mirrored element (101) includes a first section (201) that is translucent when a backlight (301) is on and mirrored when the backlight is off (301). A second section (203) provides a mirrored surface when the backlight (301) is on and when the backlight (301) is off. The mirrored element (101) may optionally be provided with an enclosure (103). A baking process may be utilized to provide the second section (203) of the mirrored element (101).

23 Claims, 2 Drawing Sheets

MIRRORED ELEMENT

FIELD OF THE INVENTION

This invention relates to mirrors, including but not limited to backlit mirrors.

BACKGROUND OF THE INVENTION

Mirrors are often accompanied by a light to illuminate a person's face as he/she looks in the mirror. Such lights are often disposed above or to the side(s) of the mirror, resulting in shadows on the person's face.

Cosmetic mirrors exist that consist of a small mirror with a light disposed on or near the outer perimeter of the mirror. These mirrors are typically much smaller than a wall mirror and often are disposed on a stand to make them portable, thus taking up space on a vanity or counter.

Backlit mirrors that distribute light around the outer perimeter of a mirror from behind a mirror centered in an enclosure, require a relatively deep concave surface behind the mirror, which limits the mirror and enclosure to a circular shape and limits the ratio of the mirror size and enclosure size.

DESCRIPTION OF A PREFERRED EMBODIMENT

The following describes an apparatus for and method of providing a mirrored element that has a first section that is translucent when a light shines through it from behind and a second section that is opaque and provides a mirrored surface whether or not light shines through the mirrored element.

Figure 1:
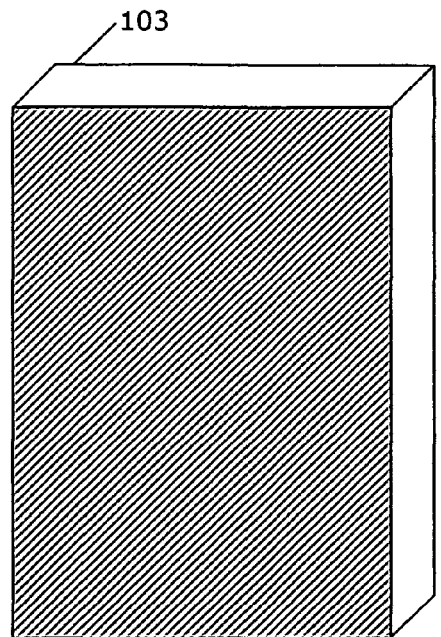
FIG. 1 is a perspective view of a mirrored element with an enclosure and its light off in accordance with the invention.

A perspective view of a mirrored element 101 with an enclosure 103 and its light off is shown in FIG. 1. A mirrored element 101 is shown, for example, as a cover for an enclosure 103. The enclosure 103 may be surface-mounted, recessed or semi-recessed, stand-alone or attached to a fixed or movable/extendable/expandable bracket. The mirrored element 101 may be part of a wall, ceiling, medicine cabinet, furniture, or other place where a mirror and/or light may be desirable. The mirrored element 101 is comprised of a half-silver-coated mirror, also known in the art as a one-way mirror. Light directed from the outside of the enclosure 103 toward the mirrored element 101 is reflected, i.e., a mirror is provided. The mirrored element 101 and the enclosure 103 may take on any shape, i.e., rectangular, circular, oval, or a combination, as well as any desirable size. One or more of the inner surfaces of the enclosure 103 may be comprised of a reflective surface, such as white or reflective materials, polished stainless steel or aluminum, or a standard mirrored surface to more efficiently direct light from inside the enclosure through the mirrored element 101.

Figure 2:
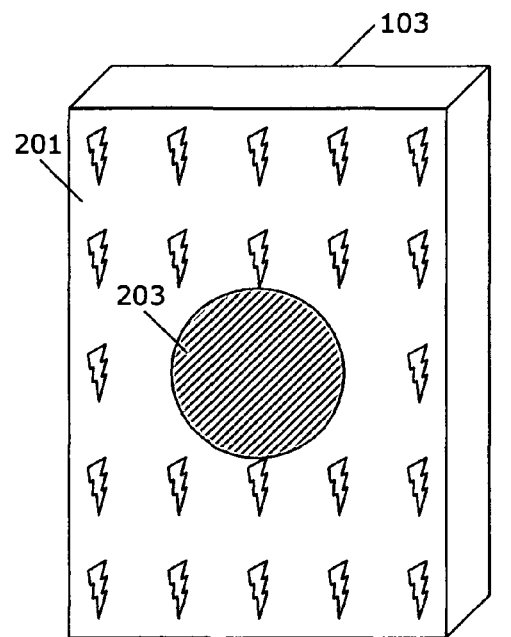
FIG. 2 is a perspective view of a backlit mirrored element with an enclosure in accordance with the invention.
Figure 3:
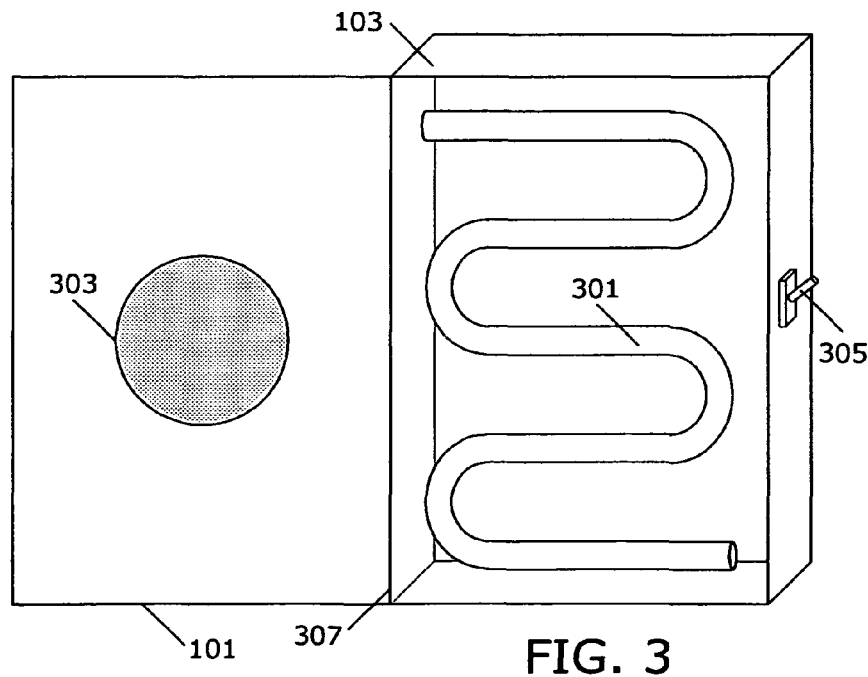
FIG. 3 is a perspective view of the inside of an enclosure with a mirrored element in accordance with the invention.

A perspective view of a backlit mirror 101 with an enclosure 103 is shown in FIG. 2. When a light 301, such as shown in FIG. 3, inside the enclosure 103 is turned on or activated, a backlight is provided that directs light, illustrated by lightning bolts, from inside the enclosure through the mirrored element 101. The mirrored element 101 comprises two sections, a first section 201 and a second section 203. Light from behind the mirrored element 101 shines through the first section 201, but does not shine through the second section 203, resulting in a mirrored area that reflects, for example, a person's face that is lit up by the light that shines through the first section 201. Because the light shines through the mirrored element 101 from the area surrounding the second section 203, shadows are effectively diminished from the person's face.

The first section 201 is translucent when lit from behind, i.e., backlit. The first section is translucent and as such may be transparent or shaded such that light passes through it from behind. Light directed from inside the enclosure 103 passes through the mirrored element 101 through the first section 201. The first section 201 may take on any size or shape.

Figure 4:
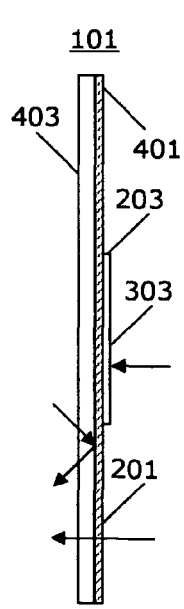
FIG. 4 is a side view of a mirrored element in accordance with the invention.

The second section 203 prevents light from shining through it from inside the enclosure 103. The second section 203 may be comprised of a very thin object or segment, such as a thin plane of opaque plastic, glass, metal, or a other material disposed on an inner surface of the mirrored element 101 (see FIG. 4). The second section 203 may be comprised of a layer or film of a chemical disposed on the inner surface of the mirrored element 101 providing an opaque surface 303, such as shown in FIG. 4 and its associated text. The second section 203 may take on any size or shape, as long as it fits within the confines of the outer perimeter of the first section 201.

Figure 5:
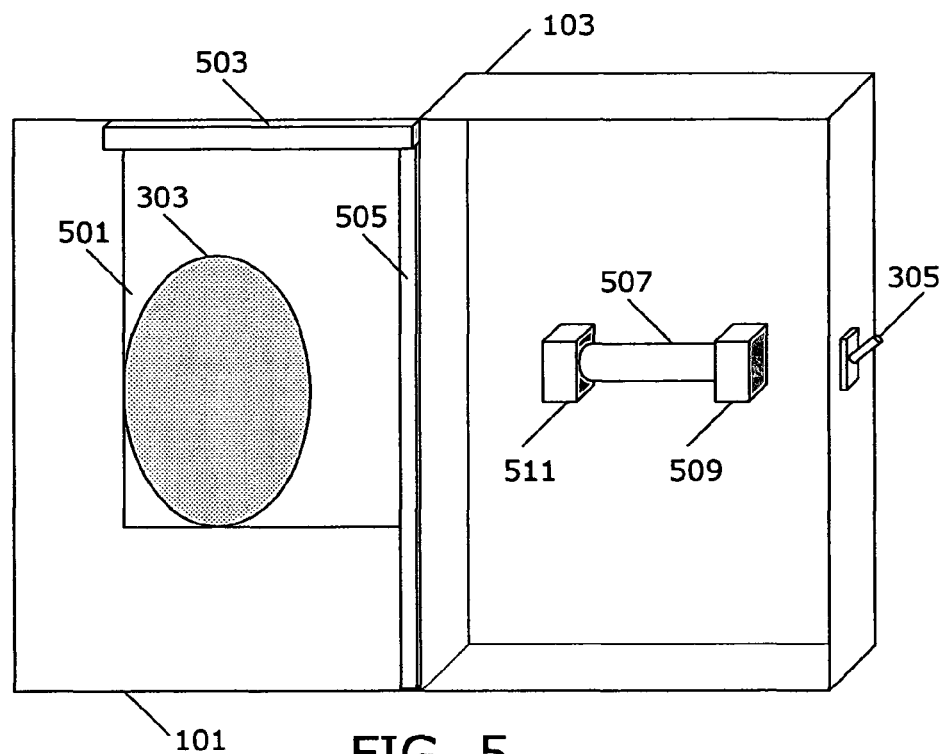
FIG. 5 through FIG. 7 illustrates an alternative embodiments of opaque surfaces in accordance with the invention.

A perspective view of the inside of an enclosure 103 with a mirrored element 101 is shown in FIG. 3. The light 301 may be, for example, incandescent, cold cathode, neon, fluorescent, compact fluorescent, light emitting diodes (LEDs), plasma, electroluminescent (EL), and so forth, or any combination thereof. The light source of the light 301 may be a single elongated bulb or a plurality of bulbs or LEDs. The shape of the bulb may be elongated, straight, curved, curvilinear, or a combination thereof. The light 301 may provide a one or more different colors, such as may be provided by bulbs of different colors, or may be a color changing lighting system. The light 301 may provide a variety of different lighting levels, such as may be provided by dimming control (s). The light 301 is shown in FIG. 3 with a curvilinear bulb, known in the art as a grid light. For example, the grid light may have 4 inch (10 cm) centers with 3 inch (7.5 cm) spacing, and may extend to within 2 inches (5 cm) of each enclosure 103 wall. A grid light advantageously provides more distributed light through the first section 201. An alternative light 507 is shown in FIG. 5 by an elongated bulb with a ballast or transformer 509 and a mounting device 511, as known in the art. Generally, the ballast or transformer 509 may be mounted internally, externally, or remotely with respect to the enclosure 103.

A switch 305 may be provided to activate and inactivate the light 301. The switch 305 may be locally or remotely placed, and may be remotely controlled, for example, by radio frequency or infrared control. The enclosure 103 may be very low-profile, for example, when the light is comprised of LEDs or very narrow bulbs. The mirrored element 101 may be permanently attached to the enclosure 103 or may be temporarily attached, such as with a hinge 307, as shown in FIG. 3.

A side view of a mirrored element 101 is shown in FIG. 4. A process for creating the second section 203 of the mirrored element 101 is described as follows. The mirrored element 101 includes half-silver-coated material 401 applied to one side of a substrate 403, thereby providing a one-way mirror.

The substrate 403 may be comprised of, by example but not limited to, glass, plexiglass, polycarbonate, and so forth. To create the second section 203, an opaque material is applied to part of one surface of the mirrored element 101, as shown in FIG. 4. The opaque material may be, for example, paint that adheres to the surface of the mirrored element 101, such as Stazon brand paint when the substrate 403 is glass. The paint may be light gray in color, such as with 1% to 40% black pigment mixed with white pigment. The mirrored element 101 is heated. The heating step may be performed, for example until the opaque material is cured, air bubbles are removed from the opaque material, and/or a flat bonding surface is formed between the opaque material and the one-way mirror. For example, the heating step may be performed for 15 minutes to 18 hours at a temperature between 200 and 600 degrees Fahrenheit (90 to 320 degrees C.). A clear coat may be optionally applied to the opaque material after the heating step. The clear coat may be an epoxy paint that advantageously reflects light, such that the light may be redirected by reflection through the first element 201. Other combinations of opaque material(s), color, time, temperature, and optionally clear coat may be utilized, as may be determined by trial and error, within the spirit of the present invention. Opaque materials that do not require heating may also be utilized to form the second section 203, for example, applied rubber coatings or other chemical coatings.

By appropriately processing the opaque material with the baking process described above, various advantages may result. For example, when the light 301 is off, the first section 201 and the second section may provide a virtually uniform mirrored surface. In other words, the second section 203 is not visibly discernable from the first section 201, generally, as shown in FIG. 1. Minor distinctions or imperfections may be present. Another way of describing this attribute is that when looking into the mirrored element 101 when the light 301 is off, an average person would not be able to distinguish the outer edges of the second section 203 from the first section 201. Although other variations of the above process may be utilized to provide the unified mirrored surface effect, one way to provide such an effect includes baking the mirrored element 101 at 320 degrees Fahrenheit (160 degrees C.) for four hours with Stazon brand paint comprised of 8% black and 92% white pigment.

As shown by the arrows near the lower part of FIG. 4, light reflects off the mirrored element 101 from the "outside" of the mirrored element 101, or from the left side of the drawing, resulting in a mirrored surface. Light from the "inside" of the mirrored element 101, or from the right side of the drawing, passes through the first section 201 of the mirrored element. Light from the "inside" of the mirrored element 101, or from the right side of the drawing, does not pass through the second section 203 of the mirrored element, thereby providing a mirrored surface in all light conditions.

A screen, shade, blind or other movable material 501 that includes an opaque section or surface 303, such as the materials described above, may provide a movable opaque material as an alternative or additional second section 203, such as shown in FIG. 5. The movable material 501 is shown as a screen in FIG. 5 and is translucent outside the opaque area 303. The movable material 501 may be partially comprised of opaque material or totally comprised of opaque material. The movable material 501 may retract into a rolling, rotating, or other type of acting component 503 that is operated by a control device 505, such as a slide that moves up and down in a track to move the opaque surface 303 up and down. The opaque surface 303 may be variably lowered, for example, to adjust to the height of the person utilizing the mirrored element 101. The movable material 501, acting component 503, and control device 505 may be attached to the mirrored element 101, the enclosure 103, or a combination thereof, or may be a separate planar element disposed between the mirrored element 101 and the enclosure 103. Although the screen 501 is shown retracting and detracting vertically, it may alternatively retract and detract in a horizontal direction, diagonal direction, or any other direction(s). The movable material 501 may alternatively rotate as part of vertical or horizontal blinds. The retracting or rotating of the movable material 501 may occur manually or automatically when the light 301 is turned on. The opaque material of the movable material 501 may be utilized in place of or in addition to a fixed segment 203, such as shown in FIG. 4. The second section 203 may have a variable size, for example, when the movable material 501 is utilized in addition to a fixed segment 203, such as shown in FIG. 4, or when the movable material 501 is extended further to expose more of an opaque surface 303, such as when the opaque surface 303 extends the entire length or width of the movable material 501.

Figure 6:
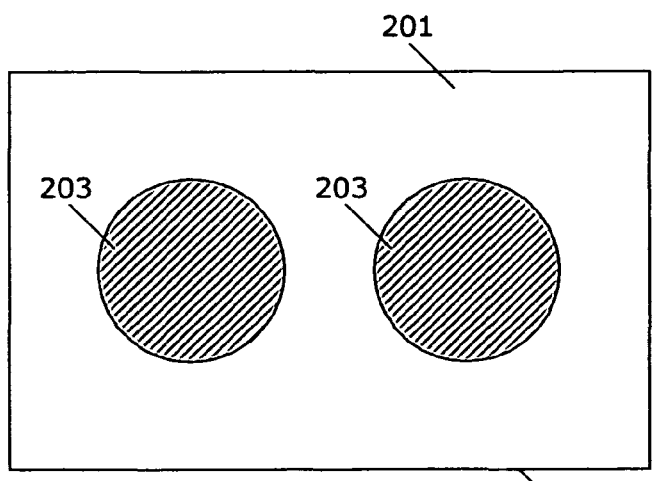
Figure 7:
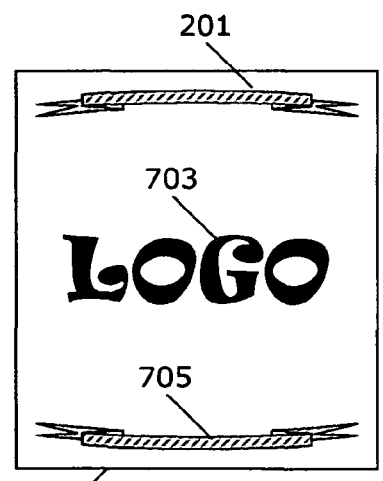

The second section 203 may take on any size or shape. The second section may comprise two or more separate areas, such as shown in FIG. 6. This mirrored element 601 may be utilized, for example, with a vanity having two or more sinks. The mirrored element 701 may comprise one or more elements of signage 703 such as shown in FIG. 7. For example, the second section 703 may be in the shape of a logo, company name, trademark, symbol(s), text, and/or a message. One or more decorative elements 705 may also be provided, for example near the outer perimeter of the first section 201.

The mirrored element, which may cover at least a part of an enclosure/housing, comprises a first section that is translucent when the light is activated and a second section that provides a mirrored surface when the light is activated. The mirrored element provides a planar facade that provides for backlighting without necessarily taking up counter space. Shadows are effectively diminished because backlighting may be provided through a first section from all points surrounding a second section of the mirrored element that provides mirroring in all lighting conditions. When no backlight is on, the mirrored element may have a unified appearance, and the first section and the second section are visibly not discernable from each other, thereby providing a larger mirrored area when not backlit. The mirrored element is not limited by ratio of mirror size and enclosure size, nor is it limited in shape, nor does it require a proportionately large depth of enclosure. Virtually any size or shape of the first section and the second section may be utilized. The mirrored element provides great design flexibility, because it may be low-profile, take on any size or shape, and because copious combinations of size and shape of the first and section sections are possible.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A mirrored element comprising:
    a substrate;
    a reflective coating disposed on a first side of the substrate;
    a gray opaque material disposed on a part of the reflective coating;

a first section that is translucent when a backlight is on and mirrored when the backlight is off;

a second section corresponding to the gray opaque material that provides a mirrored surface when the backlight is on and when the backlight is off.

2. The mirrored element of claim 1, wherein, when the backlight is off, the first section and the second section provide a virtually uniform mirror.

3. The mirrored element of claim 1, wherein the second section is disposed near a center of the first section.

4. The mirrored element of claim 1, wherein the second section is comprised of a material that is baked onto the mirrored element.

5. The mirrored element of claim 1, wherein the second section is comprised of a movable opaque material.

6. The mirrored element of claim 1, wherein the second section is variable in size during use of the mirrored element.

7. The mirrored element of claim 1, where the second section comprises at least two separate areas.

8. The mirrored element of claim 1, where the first section and the second section provide a unified mirrored surface effect when the backlight is off.

9. The mirrored element of claim 1, further comprising:
an enclosure;
a light disposed inside the enclosure, wherein the mirrored element covers at least a part of the enclosure.

10. The mirrored element of claim 9, wherein an inside surface of the enclosure is comprised of a reflective surface.

11. The mirrored element of claim 1, wherein the second section is not substantially visibly discernable from the first section when the backlight is off.

12. A mirrored element comprising:
a substrate;
a reflective coating disposed on a first side of the substrate;
a gray opaque material baked on a part of the reflective coating;
a first section that is translucent when a backlight is on and mirrored when the backlight is off;
a second section, corresponding to the gray opaque material, that provides a mirrored surface when the backlight is on and when the backlight is off;
wherein the first section and the second section provide a virtually uniform mirrored surface when the backlight is off.

13. The mirrored element of claim 12, where the second section comprises at least one element of signage.

14. The mirrored element of claim 12, further comprising a light disposed inside an enclosure, wherein the mirrored element covers at least a part of the enclosure.

15. The mirrored element of claim 12, wherein the second section comprises a light gray coating paint.

16. The mirrored element of claim 12, wherein the first section and the second section provide a unified mirrored surface effect when the backlight is off.

17. The mirrored element of claim 12, wherein the first section is substantially visibly indiscernible from the second section when the backlight is off.

18. A mirror comprising:
an enclosure;
a light disposed within the enclosure;
a mirrored element comprising:
a substrate comprising a first side facing the light;
a reflective coating disposed on a part of the first side;
a gray opaque material disposed on the reflective coating;
a first section that is translucent when the light is on and mirrored when the light is off;
a second section corresponding to the gray opaque material that provides a mirrored surface when the light is on and when the light is off.

19. The mirror of claim 18, wherein the mirrored element covers at least a part of the enclosure.

20. The mirror of claim 18, wherein the second section comprises a light gray coating.

21. The mirror of claim 18, wherein the substrate is comprised of glass.

22. The mirror of claim 18, wherein the first section and the second section provide a unified mirrored surface effect when the backlight is off.

23. The mirror of claim 18, wherein any edge of the second section is substantially indistinguishable from the first section when the backlight is off.

\* \* \* \* \*